(12) United States Patent
Creyghton et al.

(10) Patent No.: US 7,192,900 B2
(45) Date of Patent: Mar. 20, 2007

(54) HYDROCRACKING CATALYST

(75) Inventors: Edward Julius Creyghton, Amsterdam (NL); Cornelis Ouwehand, Amsterdam (NL)

(73) Assignee: Shell Oil Company, Houston, TX (US)

(*) Notice: Subject to any disclaimer, the term of this patent is extended or adjusted under 35 U.S.C. 154(b) by 0 days.

(21) Appl. No.: 10/720,619

(22) Filed: Nov. 24, 2003

(65) Prior Publication Data

US 2004/0152587 A1   Aug. 5, 2004

Related U.S. Application Data

(60) Provisional application No. 60/429,620, filed on Nov. 27, 2002.

(51) Int. Cl.
- B01J 29/08 (2006.01)
- B01J 29/14 (2006.01)
- B01J 29/16 (2006.01)

(52) U.S. Cl. .................. 502/79; 502/64; 502/85; 502/86; 423/713; 423/DIG. 21; 208/111.01; 208/111.3; 208/111.35

(58) Field of Classification Search .......... 423/713, 423/714, 715, DIG. 21; 502/79, 85, 86; 208/111.01, 111.3, 111.35
See application file for complete search history.

(56) References Cited

U.S. PATENT DOCUMENTS

| | | | |
|---|---|---|---|
| 3,130,007 A | 4/1964 | Breck | |
| 4,085,069 A | 4/1978 | Alafandi et al. | |
| 4,401,556 A | 8/1983 | Bezman et al. | |
| 4,784,750 A | 11/1988 | Dufresne et al. | 208/120 |
| 5,223,240 A * | 6/1993 | Roland et al. | 423/713 |
| 5,234,876 A | 8/1993 | Swaroop | |
| 5,242,677 A * | 9/1993 | Cooper et al. | 423/714 |
| 5,435,987 A | 7/1995 | Cooper | |
| 5,536,687 A | 7/1996 | Ward | 502/67 |
| 6,136,291 A * | 10/2000 | Chester et al. | 423/713 |
| 2002/0094931 A1 | 7/2002 | Wang et al. | 502/63 |
| 2004/0141911 A1* | 7/2004 | Cooper et al. | 423/713 |

FOREIGN PATENT DOCUMENTS

| | | |
|---|---|---|
| EP | 0098040 | 1/1984 |
| EP | 0310164 | 4/1989 |
| EP | 0310165 | 4/1989 |
| EP | 0247679 | 12/1989 |
| EP | 0421422 A2 | 4/1991 |
| EP | 0428224 | 5/1991 |
| GB | 2014970 | 9/1979 |
| GB | 2114594 | 8/1983 |
| WO | 95/03248 | 2/1995 |
| WO | WO1995/15208 A * | 6/1995 |
| WO | WO1997/00723 A * | 1/1997 |
| WO | 99/32582 | 7/1999 |
| WO | WO2000/51940 A * | 9/2000 |

OTHER PUBLICATIONS

"Dealuminated Faujasite-Type Structures with SiO2/Al2O3 Ratios Over 100," Journal of Catalysis, vol. 54, 1978, pp. 285-288.
"Catalysis: An Integrated Approach to Homogenous, Heterogenous and Industrial Catalysis," J. A. Moulijin et al., 1993, Elsevier, Amsterdam, pp. 425-433 XP02278814, p. 427, 2nd last paragraph.
"D4365-95(2001) Standard Test Method for Determining Micropore Volume and Zeolite Area of a Catalyst," 2001, ASTM XP02278823.
International Search Report of May. 17, 2004.
"Adsorption of Gases in Multimolecular Layers," by Stephen Brunauer, P. H. Emmett and Edward Teller, *J. Am. Chm. Soc.*, 60, 309 (1938) pp. 309-319.
"Studies on Pore Systems in Cataysts I. The Adsorption of Nitrogen; Apparatus and Calculation," by B.C. Lippens, B.G. Linsen, and J.H. De Boer, *Journal of Catalysis* 3-32, (1964), pp. 32-37.
"Estimation of the Zeolite Content of a Catalyst From Nitrogen Adsorption Isotherms," by Marvin F. L. Johnson, *Journal of Catalysis* 52, (1978) pp. 425-431.
"Relationship Between Zeolite Framework Composition and Hydrocracking Catalyst Performance," by Richard Bezman, *Catalysis Today*, 13 (1992) pp. 143-156.

* cited by examiner

*Primary Examiner*—David Sample
(74) *Attorney, Agent, or Firm*—Charles W. Stewart

(57) ABSTRACT

Hydrocracking catalyst composition comprising an optional metal hydrogenation component supported on a carrier comprising a zeolite of the faujasite structure having a unit cell size in the range of from 24.10 to 24.40 Å, a bulk silica to alumina ratio (SAR) above about 12, and a surface area of at least about 850 m²/g as measured by the BET method and ATSM D4365-95 with nitrogen adsorption at a p/po value of 0.03.

31 Claims, No Drawings

HYDROCRACKING CATALYST

This application claims the benefit of U.S. Provisional Application No. 60/429,620 filed Nov. 27, 2002, the entire disclosure of which is hereby incorporated by reference.

FIELD OF THE INVENTION

The present invention relates to catalyst compositions and their use in hydrocracking.

BACKGROUND OF THE INVENTION

Hydroconversion processes are important in the modern world in providing important basic fuels for everyday life. As it becomes of an increasing necessity to utilize heavier crude oil feedstocks, the oil refining industry has turned to hydrocracking processes to provide the lighter basic fuels which modern society demands. While amorphous hydrocracking catalysts are used, modern hydrocracking catalysts are often based on zeolitic materials.

Faujasite materials are one of the main zeolitic materials proposed for hydrocracking use. Early findings showed that modification of the basic materials described in U.S. Pat. No. 3,130,007 to produce a lowering of the unit cell size, gave improved selectivity to the desired middle distillate, or mid-barrel, products. To achieve this a combination of steam calcination and dealumination, usually acid-dealumination, techniques has been proposed, for example in GB-A-2,114, 594; EP-A-98040; EP-A-247,679; and EP-A-421,422.

However the increased selectivity is obtained at the cost of a reduced activity, leading to a shorter catalyst lifetime, and a reduced crystallinity when the dealumination not only selectively removes aluminium but also partially destroys the faujasite crystalline structure. This in turn can reduce the available surface area and affect zeolite effectiveness.

Thus the materials documented in EP-A-421,422 which aim to be high surface area materials (also with other specific properties) have only a highest recorded surface area obtained of 752 $m^2/g$, and have a 90% or less retained crystallinity.

In most of the dealumination treatments recorded in literature, the treatment often not only results in reduction of unit cell size but also a reduction in active surface area.

SUMMARY OF THE INVENTION

It has been found that by careful selection of the starting materials, in particular by use of low alkali containing faujasite zeolites, and a carefully selected combination of moderate steam calcination conditions plus moderate acid or acid-ammonium dealumination conditions, it is possible to obtain faujasite zeolites of low unit cell size, high surface area and a wide range of silica to alumina molar ratios, whilst retaining a very high crystallinity, which are particularly useful in hydrocracking.

When forming the support of a hydrocracking catalyst, said catalysts have been found to combine the selectivity of the known low unit cell size faujasites with the activity normally only associated with catalysts utilizing higher unit cell size materials.

The present invention provides a hydrocracking catalyst composition, which comprises a zeolite of the faujasite structure having a silica to alumina molar ratio (bulk) of greater than 12; a unit cell size in the range of from 24.10 to 24.40 Å; and a surface area of at least 850 $m^2/g$, as measured by the BET method and ASTM D 4365-95 with nitrogen adsorption at a p/po value of 0.03; preferably together with a binder and a metal hydrogenation component.

It has been found that by utilizing a combination of moderate steam calcination treatment and acid-dealumination treatment, it is possible to prepare faujasite-type zeolites which have these very desirable properties in the form of high surface area, low unit cell size and a useful micropore volume, and which retain a high crystallinity. Care has to be taken in the combination of treatment conditions utilized on the one hand to avoid severe conditions, in order to avoid destruction of the zeolite crystalline structure, but on the other not to utilize too moderate a set of conditions which, whilst producing a crystalline zeolite, will not produce the desirable high surface area of the zeolites of use in the present invention.

The invention also provides a process for preparing the present high surface area zeolites of the faujasite structure, i.e. a surface area of greater than about 850 $m^2/g$, which process comprises:

a) providing a starting zeolite of the faujasite structure having a silica to alumina ratio of from about 4.5 to about 6.5 and an alkali level of less than about 1.5% wt;

b) hydrothermally treating said starting zeolite at a temperature in the range of from 600 to 850° C. and at a partial pressure of steam in the range of from 0.2 to 1 atmosphere for a time effective to produce a intermediate zeolite having a unit cell size of from 24.30 to 24.45 Å;

c) contacting the intermediate zeolite with an acidified solution comprising an acid and optionally an ammonium salt under conditions effective to produce a high surface area zeolite having a unit cell size in the range of from 24.10 to 24.40 Å, a molar silica to alumina ratio of greater than about 12 and a surface area of greater than about 850 $m^2/g$, thereby producing the high surface area zeolite; and d) recovering the high surface area zeolite.

DETAILED DESCRIPTION OF THE INVENTION

The zeolites utilised as the catalyst support are low unit cell size faujasite zeolites, preferably Y zeolites, having a unit cell size in the range of from 24.10 to 24.40 Å. Such low unit cell size zeolites are known in the art to provide a useful middle distillate selectivity but conventionally give less active catalysts than higher unit cell size materials. Activity is determined by the temperature required to effect a specified conversion of feedstock. Where a more active catalyst is utilised, a lower temperature is needed to achieve an equivalent conversion. In catalytic processes it is normal that over time the reaction temperature has to be increased in order to maintain a desired conversion level because of deactivation of the catalyst through coke deposition etc. A catalyst which would enable a lower reaction temperature to be used for the same desired conversion is commercially very attractive. Since catalyst deactivation occurs more quickly as reaction temperatures increases, a catalyst which provides the desired conversion at a lower temperature will also have a longer service life.

Alternatively an increase in activity would enable a reduced amount of the expensive zeolite support to be utilised for no change in desired conversion nor change in reaction conditions in a commercial plant.

The catalysts of the present invention provide such activity advantages.

This advantage has been found for a wide range of the low unit cell size zeolite Y. Most conveniently for preparation on a commercial scale, the unit cell size of the faujasite zeolite support is suitably in the range of from 24.14, preferably from 24.24, more preferably from 24.30, to 24.38, preferably to 24.36, especially to 24.35 Å. Good results have been obtained where the unit cell size is in the range of from 24.14 to 24.33 Å.

The bulk silica to alumina molar ratio (herein also termed "SAR") of the zeolite support is greater than about 12. Useful catalysts have a SAR in the range of from 20 to 100. Preferably the SAR is in the range of from 20 to 80, most preferably to 50.

The surface area of the zeolite support is high for such low unit cell size zeolites, and is at least about 850 $m^2/g$. Preferably the surface area is at least 875, most preferably at least 890, and especially at least 910 $m^2/g$. The surface area of a zeolite is an indication of the available or active surface area in the pores of the material and also of the crystalline nature of the zeolite.

Preferably the zeolite utilised in the invention has a micropore volume of greater than about 0.28 $m^2/g$, most preferably greater than 0.30 $m^2/g$. For low unit cell size zeolites, this is also a high value and is indicative of a high zeolite crystallinity, i.e. that following dealumination, the crystal structure of the zeolite is retained intact. Generally, the micropore volume lies in the range of from 55% and 70% of the total pore volume, especially from 60% to 70%.

The zeolite also preferably has an alkali level of less than 0.2% wt, most preferably less than 0.1% wt, based on the zeolite. The zeolite desirably has as low an alkali level as possible. While certain of the zeolites may have no alkali remaining in their structure, by current analytical techniques this cannot be detected. Certain zeolites of the invention therefore may have no detectable alkali level.

The silica to alumina molar ratio of the faujasite zeolite of the invention is the bulk or overall ratio. This can be determined by any one of a number of chemical analysis techniques. Such techniques include x-ray fluoresence, atomic adsorption, and ICP (inductive coupled plasma). All will provide substantially the same bulk ratio value.

The unit cell size for a faujasite zeolite is a common property and is assessable to an accuracy of ±0.01 Å by standard techniques. The most common measurement technique is by x-ray diffraction (XRD) following the method of ASTM D3942-80.

Surface area is determined in accordance with the well known BET (Brunauer-Emmett-Teller) nitrogen adsorption technique, often simply termed the BET method. Herein also the general procedure and guidance of ASTM D4365-95 is followed in the application of the BET method to zeolite Y materials. To ensure a consistent state of the sample to be measured, suitably all samples undergo a pretreatment. Suitably the pretreatment involves heating the sample, for example to a temperature of 400 to 500° C., for a time sufficient to eliminate free water, eg 3 to 5 hours. The nitrogen porosimetry measurements utilised in the surface area (BET) determination, are also used to determine the total pore volume and micropore volume for the zeolites of the present invention. Herein 'micropore volume' is used to indicate the pore volume in pores having a diameter of less than 2 nm (20 Å). The assessment of micropore volume is particularly derived from the BET measurement techniques by an evaluation method called the t-plot method (or sometimes just termed the t-method) as described in the literature (Journal of Catalysis 3,32 (1964)).

All of the above measurement and determination procedures are well known to those skilled in the art.

The present high surface area zeolites of the faujasite structure, i.e. a surface area of greater than about 850 $m^2/g$, are suitably prepared by a process which comprises:

a) providing a starting zeolite of the faujasite structure having a silica to alumina ratio of from about 4.5 to about 6.5 and an alkali level of less than about 1.5% wt;

b) hydrothermally treating said starting zeolite at a temperature in the range of from 600 to 850° C. and at a partial pressure of steam in the range of from 0.2 to 1 atmosphere for a time effective to produce a intermediate zeolite having a unit cell size of from 24.30, preferably from 24.35, especially from 24.38, to 24.45 Å, preferably to 24.43 Å, especially to 24.42 Å;

c) contacting the intermediate zeolite with an acidified solution comprising an acid and optionally an ammonium salt under conditions effective to produce a high surface area zeolite having a unit cell size in the range of from 24.10 to 24.40 Å, a molar silica to alumina ratio of greater than about 12 and a surface area of greater than about 850 $m^2/g$, thereby producing the high surface area zeolite; and d) recovering the high surface area zeolite.

The low alkali metal starting material may be prepared by techniques well known in the art, for example by reiterative ammonium ion exchange of higher alkali metal containing zeolite until the desired alkali metal level is achieved, such as is described in U.S. Pat. No. 4,085,069, or via the potassium ion exchange technique disclosed in U.S. Pat. No. 5,435,987 and International Patent Specification No. WO 95/03248, all of which publications are incorporated by reference. The starting zeolites most suitably have a unit cell size in the range of from 24.60 to 24.78 Å.

An important aspect of the starting zeolites is the low alkali level. The term alkali and alkali metal are used herein interchangeably. Both terms are generally used to indicate alkali metal oxide, for example sodium oxide and/or potassium oxide. The amount is easily determined by, for example, XRF—a quick chemical analysis technique. Most suitably about 1% wt or less alkali oxide is present in the starting zeolite.

It has been found that the zeolites for use in the present invention that have the highest surface area and desirable micropore volume can consistently be provided when both an acid and an ammonium salt are utilized in step c). However very useful materials can be prepared when just an acid, suitably a strong acid, is used in the dealumination step c).

The conditions which are useful to produce the high surface zeolitic materials will of course vary depending on the type of acid and optional ammonium salt used, and on the conditions such as temperature and time under which the dealumination step is performed. Generally the temperature and time conditions for the dealumination step c) and the concentration of acid and optional ammonium solutions used, all work together to achieve the results wanted, for example if the temperature is not at a sufficiently high level, then insufficient aluminium ions will be removed in the step c) to achieve the desirable zeolites.

Step c) may be carried out at a temperature in the range of from ambient temperature, for example 20° C., to 100° C. Preferably an elevated temperature is used, most suitably in the range of from 40 to 80° C. In the laboratory environment often the lower temperatures in this range are used; however on a commercial scale, the treatment temperatures may often be in the range of from 60 to 80° C. The dealumination time may be in the range of from 0.5 hours to 10 hours, and is most conveniently from 1 to 5 hours. Naturally the higher the concentration of acid and optional ammonium salt used, the shorter the treatment time. Again, however, the timescale can vary from laboratory scale (where a batch treatment is usual) to commercial scale (where continuous treatment is normal); in the latter the dealumination time may vary dependent on throughflow of material in the treatment vessel.

The concentration of acid solution used is not critical. Useful materials may be prepared for example when using hydrochloric acid in a concentration of as little as 0.7 milliequivalents $H^+$ per g of zeolite to as much as 40. The most useful materials have been prepared using an acid dosage in the range of from 5 to 20, preferably from 9 to 20, milliequivalents $H^+$ per g of zeolite.

Equally the concentration of ammonium salt, when used, is not critical. Useful materials may be prepared for example using a dosage of from about 4 to about 40 milliequivalents $NH_4^+$ per g of zeolite. The most useful materials have been prepared when using from about 4 to about 20 milliequivalents $NH_4^+$ per g of zeolite.

It is possible to perform either a single step or a multi-step dealumination in order to preserve the crystallinity of the zeolite treated but also to ensure, where necessary, that a mild acid treatment is performed in each step. It is thus possible that a treatment with 20 milliequivalents $H^+$ per g of zeolite can be performed in two steps using 10 milliequivalents in each. Most conveniently each step is carried out using the same delauminant materials and under the same reaction conditions.

Acids that may be used in step c) are inorganic acids or organic acids, for example acetic, formic or oxalic acids. Preferred acids are inorganic or mineral acids having a pKa below 0—often termed 'strong acids' in the art. Non-limiting examples of inorganic acids that can be used in the process of the invention are hydrochloric acid, nitric acid and sulphuric acid. Preferably a monovalent acid such as hydrochloric acid and nitric acid is used. Usefully the acid is used in the form of an aqueous solution.

Generally any ammonium salt may conveniently be used, suitable examples are ammonium nitrate, ammonium chloride, and ammonium sulphate. Preferably the ammonium salt used is selected from ammonium chloride and ammonium nitrate.

As a result of the dealumination treatment the unit cell size decreases and the silica to alumina molar ratio increases from that of the intermediate zeolite.

Step b) is a steam calcination step. Such treatments are common in the art and may alternatively be called hydrothermal treatments. Both terms are used in this text. Both cover heating in the presence of steam. The steam may solely derive from the zeolite itself (so called self-steaming) but in the present step b) externally supplied steam is preferred to ensure consistency of the reaction conditions for the entire duration of the calcination step. To prepare zeolites of use in the present invention, it is useful for the steam calcination to be carried out at a temperature in the range of from 600 to 800° C., and preferably from 600 to 700° C., more preferably 620 to 680° C., especially 630 to 670° C. The steaming is most usefully carried out for in the range of from 0.5 hours to 5 hours, preferably 1 to 3 hours.

The steam partial pressure for step b) is to be in the range of from about 0.2 to about 1 atmosphere. This can equally be written as being in the range of from 20% vol steam to 100% vol steam, basis total gas present; where another gas is present, this may be air, nitrogen or other inert gas. Useful materials have been prepared utilizing steam conditions in the range of from 90 to 100% vol. Where a lower steam partial pressure is utilised, a longer steam calcination may be necessary to achieve the desired intermediate zeolite.

Most suitably the steam calcination treatment is carried out in two steps in which the first treatment is carried out at a different temperature than the second treatment. Alternatively the treatment may be carried out in one step with a gradual, or stepped (also known as a ramped), increase in temperature over time. The temperature difference from first to second step, or from beginning to end of a treatment is usefully from 10 to 100° C., especially 20 to 50° C. In a very suitable embodiment a one step treatment is utilised wherein a gradual increase in temperature occurs over time.

Whatever heating regime is used, care must be taken to ensure that hot spots do not occur in the treatment vessel as this will yield zeolites of uneven properties.

The nature of the steaming treatment determines the conditions under which the dealumination treatment is carried out. For example, a slightly more severe steaming treatment (eg at a higher temperature) will cause a higher acid requirement to be needed to yield the high surface area-zeolites. The best combination of conditions for the equipment and materials used, can be routinely experimentally determined.

Utilizing the above process it is possible to prepare faujasite materials which have a unit cell size below about 24.40 angstoms, a surface area in excess of about 850 $m^2/g$, a bulk silica to alumina molar ratio above about 12 and a useful micropore volume.

In middle-distillate selective hydrocracking, an exceptional activity is shown by the zeolitic catalysts of the present invention which compares favourably with that shown by higher unit cell size materials having a higher alumina content. It is well known in the art that faujasite materials with a unit cell size above 24.40 angstroms have a different selectivity to the known lower unit cell size faujasite materials, the former being more naptha-selective, as well as having a higher activity. The materials of the present invention exhibit the high activity of the known high unit cell size materials combined with the very desirable middle distillate selectivity of the known low unit cell size materials.

In a catalyst of the present invention, the zeolite component is usefully mixed with an amorphous binder component. The amorphous binder component may be any refractory inorganic oxide or mixture of oxides conventional for such compositions. Generally this is an alumina, a silica, a silica-alumina or a mixture of two or more thereof. However it is also possible to use zirconia, clays, aluminium phosphate, magnesia, titania, silica-zirconia and silica-boria, though these are not often used in the art. The amount of zeolite in the catalyst support when binder is also present may be up to 90% by weight, but is preferably in the range of from 2, more preferably 10, especially 20, to 80% by weight, based on the total catalyst support.

It is possible, and may be preferred in certain cases, for the catalyst composition of the present invention also to include a second cracking component. This is preferably a second zeolite. Most preferably a second zeolite is selected from zeolite beta, zeolite ZSM-5, or a zeolite Y of different unit cell size. Where a second zeolite Y is used, preferably it has a unit cell size greater than 24.40 Å. A second cracking component may be present in an amount up to 20 parts by weight, based on total zeolite plus binder, but preferably is present in an amount in the range of from 0.5 to 10 parts by weight.

It should be noted that amorphous silica alumina may act both as a second cracking component and as a binder. As a cracking component it is most usefully employed in high operating temperature processes; as a binder it has been found useful in protecting a zeolite from loss of crystallinity, and therefore deactivation, in use in any process that water and/or fluoride is present or generated. In the preparation of the catalyst of the invention, following the mixing of zeolite with binder and second cracking component, if any, an acidic aqueous solution is added to the mixture after which it is mulled and extruded. Any convenient mono-basic acid may be used for the acidic solution; examples are nitric acid and acetic acid. During extrusion, conventionally extrusion aids are utilized; usual extrusion aids include Superfloc, obtainable from Nalco.

At least one hydrogenation component is preferably incorporated into the catalyst of the invention. This addition may occur at any stage during catalyst preparation, using techniques conventional in the art. For example, the hydrogenation component can be added to the zeolite, or a mixture of zeolite and binder, through co-mulling. Alternatively the hydrogenation component may be added to the formed extrudates either before or after calcining, using conventional impregnation techniques, eg as one or more aqueous impregnating solutions of Group VIB and/or Group VIII metal salts.

Herein reference is made to the Periodic Table of Elements which appears on the inside cover of the CRC Handbook of Chemistry and Physics ('The Rubber Handbook'), 66$^{th}$ edition and using the CAS version notation.

Suitably the hydrogenation component is selected from nickel, cobalt, molybdenum, tungsten, platinum and palladium.

Examples of hydrogenation components that may thus suitably be used include Group VIB (e.g. molybdenum and tungsten) and Group VIII metals (e.g. cobalt, nickel, iridium, platinum and palladium), their oxides and sulphides. The catalyst composition will preferably contain at least two hydrogenation components, e.g. a molybdenum and/or tungsten component in combination with a cobalt and/or nickel component. Particularly preferred combinations are nickel/tungsten and nickel/molybdenum. Very advantageous results are obtained when these metal combinations are used in the sulphide form.

The present catalyst composition may contain up to 50 parts by weight of hydrogenation component, calculated as metal per 100 parts by weight (dry weight) of total catalyst composition. For example, the catalyst composition may contain from 2 to 40, more preferably from 5 to 30 and especially from 10 to 20, parts by weight of Group VIB metal(s) and/or from 0.05 to 10, more preferably from 0.5 to 8 and advantageously from 1 to 6, parts by weight of Group VIII metal(s), calculated as metal per 100 parts by weight (dry weight) of total catalyst composition.

The present invention also provides a process for converting a hydrocarbonaceous feedstock into lower boiling materials which comprises contacting the feedstock with hydrogen at elevated temperature and elevated pressures in the presence of a catalyst composition according to the present invention.

Examples of such processes comprise single-stage hydrocracking, two-stage hydrocracking, and series-flow hydrocracking. Definitions of these processes can be found in pages 602 and 603 of Chapter 15 (entitled "Hydrocarbon processing with zeolites") of "Introduction to zeolite science and practice" edited by van Bekkum, Flanigen, Jansen; published by Elsevier, 1991.

It will be appreciated that the hydroconversion processes of the present invention can be carried out in any reaction vessel usual in the art. Thus the process may be performed in a fixed bed or moving bed reactor. Also the catalyst of the invention may be used in conjunction with any suitable co-catalyst or other materials usual in the art. Thus for example the catalyst of the invention may be used in stacked bed formation with one or more other catalysts useful in hydroprocessing, for example with a catalyst containing a different zeolite, with a catalyst containing a faujasite zeolite of different unit cell size, with a catalyst utilizing an amorphous carrier, and so on. Various stacked bed combinations have been proposed in the literature for example, WO-99/32582; EP-A-310,164; EP-A-310,165; and EP-A-428,224, all of which are incorporated by reference.

The hydrocarbonaceous feedstocks useful in the present process can vary within a wide boiling range. They include atmospheric gas oils, coker gas oils, vacuum gas oils, deasphalted oils, waxes obtained from a Fischer-Tropsch synthesis process, long and short residues, catalytically cracked cycle oils, thermally or catalytically cracked gas oils, and syncrudes, optionally originating from tar sand, shale oils, residue upgrading processes and biomass. Combinations of various hydrocarbon oils may also be employed. The feedstock will generally comprise hydrocarbons having a boiling point of at least 330° C. The boiling range will generally be from about 330 to 650° C., with preference being given to feedstocks having a boiling range of from about 340 to 620° C. The feedstock may have a nitrogen content of up to 5000 ppmw (parts per million by weight) and a sulphur content of up to 6% w. Typically, nitrogen contents are in the range from 250 to 2000 ppmw and sulphur contents are in the range from 0.2 to 5% w. It is possible and may sometimes be desirable to subject part or all of the feedstock to a pretreatment, for example, hydrodenitrogenation, hydrodesulphurisation or hydrodemetallisation, methods for which are known in the art.

The process of the invention may conveniently be carried out at a reaction temperature in the range of from 250 to 500° C., preferably in the range of from 300 to 450° C.

The present process is preferably carried out at a total pressure (at the reactor inlet) in the range of from $3 \times 10^6$ to $3 \times 10^7$ Pa, more preferably from $4 \times 10^6$ to $2.5 \times 10^7$ Pa and even more preferably from $8 \times 10^6$ to $2 \times 10^7$ Pa. Where a hydrocracking process is carried out at a low pressure of, for example $4 \times 10^6$ to $1.2 \times 10^7$ Pa, this may be termed 'mild hydrocracking'.

The hydrogen partial pressure (at the reactor inlet) is preferably in the range from $3 \times 10^6$ to $2.9 \times 10^7$ Pa, more preferably from $4 \times 10^6$ to $2.4 \times 10^7$ Pa and still more preferably from $8 \times 10^6$ to $1.9 \times 10^7$ Pa.

A space velocity in the range from 0.1 to 10 kg feedstock per liter catalyst per hour (kg.l$^{-1}$.h$^{-1}$) is conveniently used. Preferably the space velocity is in the range from 0.1 to 8, particularly from 0.2 to 5 kg.l$^{-1}$.h$^{-1}$.

The ratio of hydrogen gas to feedstock (total gas rate) used in the present process will generally be in the range from 100 to 5000 Nl/kg, but is preferably in the range from 200 to 3000 Nl/kg.

The present invention will now be illustrated by the following Examples.

EXAMPLES

In the Examples the following test methods have been used:

Unit cell size: Determined by X-ray diffraction using the method of ASTM D-3942-80.

Surface Area: Determined in accordance with the conventional BET (Brunauer-Emmett-Teller) method nitrogen adsorption technique as described in the literature at S. Brunauer, P. Emmett and E. Teller, J. Am. Chm. Soc., 60, 309 (1938), and ASTM method D4365-95. In the determinations quoted below, the results are given as a single point assessment taken at a nitrogen partial pressure of 0.03 following a high temperature pretreatment. (see also note below).

Mesopore Area: Derived from the above BET surface area. Herein 'mesopore' is used to indicate pores having a diameter of 2 nm or more. The difference between the total surface area and the mesopore area is the micropore area, where 'micropore' indicates pores having a diameter of less than 2 nm.

Silica to alumina molar ratio (SAR): Determined by chemical analysis; values quoted are 'bulk' SAR (that is to say the overall SAR) and not specifically the SAR of the crystalline framework.

Total pore volume: Determined via the BET method.

Micropore volume: Assessed by the t-plot method, also known as the t-method, using nitrogen as the adsorbate as described by Lippens, Linsen and de Boer, Journal of Catalysis, 3–32, (1964).

Crystallinity: Determined by X-ray Diffraction utilizing ASTM D3906-97, taking as the standard in each case a commercial zeolite Y of comparable low unit cell size.

Comments on the Method of Surface Area-Micropore Volume Analysis: Zeolite quality has in the literature generally been described using BET surface area. The surface area data presented here have been determined by the general procedure described in ASTM method D 4365-95. The specific recommendation in the ASTM method is that for high zeolite content materials the linear BET range is preferentially found between $p/p_o$ values of 0.01 and 0.09. The method further states that emphasis on the even lower $p/p_o$ values should be used if a negative intercept is observed. In addition Johnson (Journal of Catalysis 52, 425–431 (1978), "Estimation of the Zeolite Content of a Catalyst from Nitrogen Adsorption Isotherms") clearly shows that very little adsorption of nitrogen occurs above a $p/p_o$ value of 0.05 with zeolite Y and zeolite Y catalysts. The adsorption at nitrogen partial pressure of 0.03 $p/p_o$ has been selected as the most suitable from which to calculate a BET surface area for the zeolites of the present Examples.

The materials described in these Examples contrast in particular in surface area compared to generally available, commercially available dealuminated materials and those documented in the literature of the art. Care must be taken to compare them to materials with similar unit cell dimensions. Such materials have in the patent literature been referred to as "Ultrahydrophobic zeolite Y" (UPHY). GB-A-2,014,970 describes materials with unit cell parameters less than 24.45 angstroms as having BET surface areas from 450 $m^2/g$ to about 600 $m^2/g$. U.S. Pat. No. 4,401,556 describes the use in hydrocracking of heavy petroleum feedstock of such UPHY materials (and catalysts based on them) having surface area's in the range of from 520 to 579 $m^2/g$. EP-A-421 422 documents zeolites also suited to the hydrocracking of heavy feedstocks that have recorded BET surface areas of from 586 to 752 $m^2/g$.

Commercially available materials are also referenced in the literature. In particular U.S. Pat. No. 5,234,876 references "Ultra-stable Y-zeolite" materials, TSZ-350 and TSZ-360 available from Tosoh Corporation with BET surface areas ranging from 600 to 650 $m^2/g$. Similarly, Bezman in Catalysis Today, 13, 143–156 (1992) describes hydrothermally dealuminated Y-type zeolites (HDY's) available from the Linde Division of UOP, specifically LZ-Y20 and from PQ Corporation, specifically CBV 600 and CBV 712. All these materials are reported to have BET surface areas between 500 and 700 $m^2/g$.

Preparation of Zeolites

The zeolites utilised in the catalysts of the present invention were prepared by the following general procedures.

The starting materials used are low alkali content (<1.5% wt alkali oxide) ammonium form Y zeolites. These zeolites are prepared by one of two methods known in the art. While not meaning to be exclusive of other methods of achieving similar results, the examples were prepared by either the Cooper method (as described in U.S. Pat. No. 5,435,987) which involves $K^+$ ion exchange of Na form zeolite Y, followed by ammonium ion exchange, or by the Alafandi method (as described in U.S. Pat. No. 4,085,069) which involves ammonium exchange under autogenous superatmospheric pressure. The chemical analysis of the starting zeolites along with the general method of preparation is indicated in Table 1.

The low alkali content ammonium form Y zeolites were steam calcined in one or two steps to create an ultrastable type Y zeolite. Most of the steamed zeolites' were then subjected to an acid-dealumination treatment consisting of a one step treatment with a combination of ammonium chloride and hydrochloric acid. The specific details of the steaming treatment(s) and the ion exchange-dealumination treatment are also given in Table 1. The water content in the ion-exchange-dealumination treatment was generally sufficient to provide a zeolite slurry with from 5 to 25% anhydrous zeolite. Such variation is not believed to materially affect the results obtained.

Product properties of these materials, termed zeolites 1 to 5, are given in Table 2.

Tables 1 and 2 also detail the preparation and properties of zeolite 6. This zeolite was prepared analogously to zeolites 1 to 5, but with only a single step acid treatment performed as the acid-dealumination. The acid utilised was hydrochloric acid.

Generally it should be noted that in order to have the desired properties of a very high surface area and the preferred high micropore volume, an appropriate combination of steaming severity and acid-dealumination severity must be applied. If the precursor is too mildly steamed then it may not be sufficiently stable to a severe acid/acid-ammonium treatment, resulting in low surface area. If the material is over steamed, too much crystal structure damage will occur so that the high surface area and micropore volumes will not be achieved. Similarly, if the acid/acid-ammonium treatment is too mild, the amorphous debris created in the steaming will not be sufficiently removed and the SAR will not fall into the desired range and the surface area will be low.

TABLE 1

Preparation Methods for Zeolites 1 to 6

|  | Zeolite 1 | Zeolite 2 | Zeolite 3 | Zeolite 4 | Zeolite 5 | Zeolite 6 |
|---|---|---|---|---|---|---|
| Starting NH$_4$Y |  |  |  |  |  |  |
| Ammonium Exchange Method | Cooper | Alafandi | Cooper | Cooper | Cooper | Alafandi |
| K$_2$O, % wt | 0.47 | <0.04 | 0.62 | 1.10 | 0.40 | — |
| Na$_2$O, % wt | 0.57 | 0.25 | <0.04 | <0.04 | 0.36 | <0.02 |
| SiO$_2$/Al$_2$O$_3$, mole ratio | 5.5 | 5.0 | 5.1 | 5.5 | 5.6 | 5.1 |
| unit cell constant, Å | 24.69 | — | — | — | 24.69 | — |
| Preparation Details |  |  |  |  |  |  |
| Calcination No. 1 |  |  |  |  |  |  |
| Temperature, ° C. | 665 | 650 | 650 | 650 | 630 | 650 |
| Time, hrs | 1 | 3 | 1 | 1 | 1 | 2 |
| Steam content, % vol | 100% | 94% | 100% | 100% | 100% | 100% |
| Calcination No. 2 |  |  |  |  |  |  |
| Temperature, ° C. | 650 | — | — | — | 650 | — |
| Time, hrs | 1 | — | — | — | 1 | — |
| Steam content, % vol | 100% | — | — | — | 100% | — |
| Unit cell constant of intermediate Å | — | 24.37 | — | 24.39 | — | — |
| Dealumination-Ion Exchange |  |  |  |  |  |  |
| Temperature, ° C. | 70 | 40 | 40 | 40 | 70 | 40 |
| Time, hrs | 1 | 4 | 5 | 5 | 1 | 4 |
| Milliequivalents H$^+$ per gram | 11 | 9 | 10 | 9 | 11 | 20 |
| Milliequivalents NH$_4^+$ per gram | 4.67 | 20 | 19 | 20 | 4.67 | — |

TABLE 2

Product Properties for Zeolites 1 to 6

|  | Zeolite 1 | Zeolite 2 | Zeolite 3 | Zeolite 4 | Zeolite 5 | Zeolite 6 |
|---|---|---|---|---|---|---|
| Crystallinity, % of standard | 129 | 97 | 120 | 99 | 119 | 98 |
| SiO$_2$/Al$_2$O$_3$, mole ratio | 27.8 | 29.5 | 22.9 | 40.2 | 28.7 | 99 |
| Na$_2$O, % wt | 0.01 | <0.04 | <0.04 | <0.04 | 0.02 | <0.04 |
| K$_2$O, % wt | — | — | 0.05 | <0.04 | 0.03 | — |
| Unit cell size, Å | 24.33 | 24.32 | 24.32 | 24.31 | 24.32 | 24.14 |
| Surface area |  |  |  |  |  |  |
| Total surface area, (0.03) m$^2$/g | 920 | 916 | 910 | 969 | 893 | 926 |
| Mesopore area, m$^2$/g | 144 | 148 | 96 | 112 | 115 | 117 |
| Total pore volume, cc/g | 0.52 | 0.51 | 0.49 | 0.51 | — | — |
| Micropore volume, cc/g | 0.31 | 0.31 | 0.32 | 0.34 | 0.30 | 0.31 |

Preparation of Catalysts

The zeolites prepared above were formulated into catalysts as described below. The Y zeolites used in Comparison catalysts A to F for use in comparison activity testing are commercially available from the PQ Corporation of Philadelphia.

By the following general procedure catalysts were prepared using different amounts of zeolite and inorganic refractory oxide, generally alumina, in each catalyst formulation as noted in the Tables below. For all cases except Comparison catalyst C, Comparison catalyst E and Catalyst 3, the catalyst composition contained 4% w nickel and 19% w tungsten as metal hydrogenation component, based on total catalyst weight; Comparison catalyst C contained 17% w tungsten, and both Comparison catalyst E and Catalyst 3 contained 3.3% w nickel and 16% w tungsten. These slight differences in metals contents have no effect on the activity of such hydrocracking catalysts; any effect exhibited is limited to (slight) changes in aromatics hydrogenation.

General procedure:

A catalyst was prepared by mixing a zeolite with refractory inorganic oxide in the proportions required. Water and 3% wt nitric acid (65% wt solution) were added in order to achieve a pH of in the range of from 4.4 to 5.7 and a loss on ignition of from 50 to 60% wt and the mixture mulled in a mix-muller until an extrudable mix was obtained. The mixture was then extruded, together with an extrusion aid (Superfloc), into extrudates having, in cross-section, a tri-lobe shape. The extrudates were dried statically for 2 hours at 120° C. and then calcined for 2 hours at 535° C. The catalyst particles so obtained were of regular length and had a diameter of 2.5 mm, measured from the top to the bottom of a nominal triangle formed by the tri-lobe.

The metal hydrogenation components of nickel and tungsten were then incorporated by impregnation of the pellets with an homogenized aqueous solution of nickel nitrate and ammonium metatungstate. The impregnated extrudates were dried at ambient conditions in hot circulating air for 1 hour and then at 120° C. for 2 hours and finally calcined at 500° C. for 2 hours.

Activity Testing

The hydrocracking performance of the catalysts was assessed in a number of second stage series-flow simulation tests. The testing was carried out in once-through microflow equipment which had been loaded with a top catalyst bed comprising 1 ml C-424 catalyst (commercially available from the Criterion Catalyst & Technology Company) diluted with 1 ml of 0.1 mm SiC particles and a bottom catalyst bed comprising 10 ml of the test catalyst diluted with 10 ml of 0.1 mm SiC particles. Both catalyst beds were presulphided prior to testing.

Each test involved the sequential contact of a hydrocarbonaceous feedstock (a heavy gas oil) with the top catalyst bed and then the bottom catalyst bed in a once-through operation under the following process conditions: a space velocity of 1.5 kg heavy gas oil per liter catalyst per hour ($kg.l^{-1}.h^{-1}$), a hydrogen gas/heavy gas oil ratio of 1440 Nl/kg, a hydrogen sulphide partial pressure of $5.6\times10^5$ Pa (5.6 bar) and a total pressure of $14\times10^6$ Pa (140 bar).

The heavy gas oil used had the following properties:

| | |
|---|---|
| Carbon content: | 86.47% w |
| Hydrogen content: | 13.53% w |
| Nitrogen (N) content: | 9 ppmw |
| Added n-Decylamine: | 12.3 g/kg (equivalent to 1100 ppmw N) |
| Total nitrogen (N) content: | 1109 ppmw |
| Density (15/4° C.): | 0.8736 g/ml |
| Density (70/4° C.): | 0.8394 g/ml |
| Molar weight: | 433 g |
| Initial boiling point: | 351° C. |
| 50% w boiling point: | 451° C. |
| Final boiling point: | 605° C. |
| Fraction boiling below 370° C.: | 3.71% wt |
| Fraction boiling above 540° C.: | 10.0% wt |

Hydrocracking performance was assessed at conversion levels between 40 and 90% wt net conversion of feed components boiling above 370° C. To compare activity, the obtained results, expressed as the temperature required to obtain 65% wt net conversion of feed components boiling above 370° C., are shown in the Tables below. In the Tables the amount of zeolite is quoted as the percentage by weight based on the total catalyst support, i.e., based on the catalyst weight excluding metals content.

Example 1

In these first tests the activity of a number of comparison catalysts was assessed against catalysts of the present invention. The results are shown in Table 3.

Table 3 demonstrates that when utilizing ultrastable zeolite Y materials having a 'high' unit cell size (of above 24.40 Å) formulated into hydrocracking catalysts there is no activity gain (as shown by the T req.) with a change in unit cell size, surface area, SAR and micropore volume: both Comparison catalysts A and B show more or less the same temperature requirement (T req.) for 65% wt net conversion.

The skilled person would normally expect that below a certain unit cell size, the further lowering of the unit cell size of the zeolite support, (which indicates a lowering of the aluminium content—also shown by an increase in SAR), would lead to a loss in activity, i.e., that a higher temperature would be necessary to achieve the same conversion. This expectation is indeed shown by Comparison catalyst C in which the zeolite Y support has a significantly lower unit cell size and a higher SAR, and requires a 10° C. higher temperature for the same conversion as either of Comparison catalysts A and B.

It is thus extremely surprising to find that the catalyst of the present invention, Catalyst 1, utilizing a zeolite of similar "low" unit cell size and an even lower aluminium content (as shown by the even higher SAR) achieves the same activity as the "high" unit cell size zeolite-supported Comparison catalysts A and B.

From the results of Table 3, it can also be seen that the high activity effect is not given from only changing the SAR of the zeolite. The zeolite for Catalyst 2 has a substantially equivalent SAR to Comparison Catalyst D but the Catalyst 2 also shows an improved temperature requirement. A further increase in surface area, SAR and micropore volume, in the zeolite support yields further activity improvement (Catalyst 3).

Also, the data show that the effect is not related to the proportion of zeolite Y in the catalyst formulation, and is also exhibited by other zeolites of similar properties. Catalysts containing proportions of 50% wt and 70% wt zeolite were investigated and in each case a significantly higher activity (as shown by a temperature differential of around 10° C. in each case) was found with the catalysts of the present invention compared with a similarly formulated Comparison catalyst of similar unit cell size but lower surface area, SAR and micropore volume.

Furthermore it can be seen by comparing the temperature requirements for Catalyst 1, Catalyst 2 and Catalyst 3 and Comparison Catalyst E that with a catalyst of the present invention, only half the amount of zeolite Y is needed to achieve the same activity.

TABLE 3

| Catalyst No. | Zeolite No. | % w zeolite | unit cell size[1] (Å) | surface area[1] (m²/g) | SAR[1] | Micropore[1] volume (ml/g) | T req. (° C.) |
|---|---|---|---|---|---|---|---|
| Comparison A | — | 20 | 24.46 | 768 | 5.6 | 0.26 | 381 |
| Comparison B | — | 20 | 24.56 | 883 | 6.9 | 0.30 | 380 |
| Comparison C | — | 20 | 24.30 | 724 | 9.3 | 0.25 | 390 |
| Catalyst 1 | 1 | 20 | 24.33 | 920 | 27.8 | 0.31 | 380 |
| Comparison D | — | 25 | 24.29 | 811 | 30.8 | 0.28 | 386.5 |
| Catalyst 2 | 2 | 25 | 24.32 | 916 | 29.5 | 0.31 | 379 |
| Catalyst 3 | 4 | 25 | 24.31 | 969 | 40.2 | 0.34 | 377 |
| Comparison E | — | 50 | 24.30 | 724 | 9.3 | 0.25 | 379.5 |
| Catalyst 4 | 2 | 50 | 24.32 | 916 | 29.5 | 0.31 | 370 |
| Comparison F | — | 70 | 24.30 | 724 | 9.3 | 0.25 | 375 |
| Catalyst 5 | 5 | 70 | 24.32 | 893 | 28.7 | 0.30 | 368 |
| Catalyst 6 | 3 | 70 | 24.32 | 910 | 22.9 | 0.32 | 366 |

[1]properties of the zeolite

Example 2

In this Example, an assessment of the hydrocracking selectivity to middle distillate hydrocarbons of catalysts of the present invention was made.

Middle distillate is to be understood herein to be the kerosine plus gas oil boiling range of hydrocarbons.

To obtain a true comparison of selectivities between catalysts, it is necessary to compare the selectivity at a constant activity, i.e. at the same Treq. Accordingly in Table 4 product selectivities for a Comparison catalyst and for catalyst of the present invention are compared on this basis. In particular the selectivities to the following products: $C_1$-$C_4$ hydrocarbons, $C_5$ to 150° C. (naphtha) and 150 to 370° C. (kerosine and gas oil) are recorded.

It can be seen that the product selectivity is very similar.

TABLE 4

| Catalyst No. | Zeolite No. | % w zeolite | Unit[1] cell size (Å) | Surface[1] area (m²/g) | SAR[1] | Micropore[1] volume (ml/g) | T req. (° C.) | Product Selectivity | | |
|---|---|---|---|---|---|---|---|---|---|---|
| | | | | | | | | C1–C4 (% w) | C5–150 ° C. (% w) | 150–370 ° C. (% w) |
| Comparison E | — | 50 | 24.30 | 724 | 9.3 | 0.25 | 379.5 | 4.0 | 33.3 | 62.6 |
| Catalyst 7 | 5 | 25 | 24.32 | 893 | 28.7 | 0.30 | 380 | 4.1 | 33.6 | 62.3 |
| Catalyst 2 | 2 | 25 | 24.32 | 916 | 29.5 | 0.31 | 379 | 4.1 | 33.9 | 62.0 |
| Comparison G | — | 70 | 24.30 | 724 | 9.3 | 0.25 | 375 | 4.4 | 34.7 | 60.9 |
| Catalyst 8 | 6 | 40 | 24.14 | 926 | 99 | 0.31 | 375 | 4.3 | 34.4 | 61.2 |

[1]properties of the zeolite

Example 3

A catalyst was prepared following the Catalyst Preparation procedure above but with a small weight amount of zeolite beta added to the dry zeolite-alumina mixture prior to the addition of water and acid. For Catalyst 9, 4% w zeolite beta was added. The zeolite beta used had a silica to alumina molar ratio of approximately 200 and was obtained from Zeolyst International under product code CP811B-200.

The selectivity of the Catalyst 9 was assessed against that of Catalyst 2 which has a comparable activity. The results are given in Table 5 below. It can be seen that the inclusion of a small amount of zeolite beta provides an improvement in middle distillate selectivity of the catalysts of the invention.

TABLE 5

| Catalyst No. | Zeolite No. | % w zeolite | Unit[1] cell size (Å) | Surface[1] area (m²/g) | SAR[1] | Micropore[1] Volume (ml/g) | T req. (° C.) | Product Selectivity | | |
|---|---|---|---|---|---|---|---|---|---|---|
| | | | | | | | | C1–C4 (% w) | C5–150 ° C. (% w) | 150–370 ° C. (% w) |
| Catalyst 2 | 2 | 50 | 24.32 | 916 | 29.5 | 0.31 | 370 | 5.2 | 37.5 | 57.3 |
| Catalyst 9 | 3 | 36; 4 | 24.32 | 910 | 22.9 | 0.32 | 370 | 4.0 | 34.4 | 61.5 |

[1]properties of the zeolite Y

What is claimed:

1. A middle distillate selective hydrocracking catalyst composition which comprises a metal hydrogenation component selected from the group of metals consisting of molybdenum, tungsten, cobalt, nickel and combinations of two or more thereof supported on a carrier comprising an amorphous binder component and from 2 to 80% by weight, based on the total weight of the carrier, a zeolite of the faujasite structure having a unit cell size in the range of from 24.14 to 24.38 Å, a bulk silica to alumina ratio (SAR) above about 12, a surface area of at least about 850 m²/g as measured by the BET method and ATSM D 4365-95 with nitrogen adsorption at a p/po value of 0.03, and a micropore volume of at least about 0.28 ml/g.

2. A composition as claimed in claim 1, wherein the zeolite has a unit cell size in the range of from 24.24 to 24.38 Å.

3. A composition as claimed in claim 1, wherein the zeolite has a SAR in the range of from about 20 to about 100.

4. A composition as claimed in claim 1, wherein the zeolite has a surface area of at least about 890 m²/g.

5. A composition as claimed in claim 1, wherein the zeolite has a micropore volume greater than 0.30 ml/g.

6. A composition as claimed in claim 1, which further comprises a second zeolite.

7. A composition as claimed in claim 6, which further comprises in the range of from 1 to 5% by weight of zeolite beta, basis total carrier.

8. A hydrocracking catalyst composition of any one of claims 1, 2, 3, 4, 5, 6, and 7, wherein said zeolite is made by a process which comprises
   a) hydrothermally treating a starting zeolite of the faujasite structure having a silica to alumina molar ratio in the range of from about 4.5 to about 6.5, and an alkali content of less than about 1.5% wt; at a temperature in the range of from 600° C. to 800° C. and at a partial pressure of steam in the range of from about 0.2 to about 1 atmosphere for a time effective to produce an intermediate zeolite having a unit cell size of from 24.30 to 24.45 Å;
   b) contacting said intermediate zeolite with an acidified solution comprising an acid and an ammonium salt under conditions effective to produce said zeolite; and
   c) recovering said zeolite.

9. A middle distillate selective hydrocracking catalyst composition as recited in claim 1, wherein said unit cell size of said zeolite is in the range of from 24.24 to 24.38 Å and said bulk silica to alumina ratio is in the range of from 20 to 100.

10. A middle distillate selective hydrocracking catalyst composition as recited in claim 9, wherein said metal hydrogenation component includes at least two hydrogenation components with a first hydrogenation component selected from the group consisting of molybdenum and tungsten, and a second hydrogenation component selected from the group consisting of nickel and cobalt.

11. A middle distillate selective hydrocracking catalyst composition as recited in claim 10, further comprising: a second zeolite selected from the group consisting of zeolite beta, ZSM-5 and zeolite Y having a second zeolite unit cell size greater than 24.40 Å.

12. A middle distillate selective hydrocracking catalyst composition as recited in claim 11, wherein said amorphous binder component is selected from the group consisting of alumina, silica, silica-alumina, and mixtures thereof.

13. A middle distillate selective hydrocracking catalyst composition as recited in claim 12, wherein said zeolite is present in said composition in amount up to 90 weight percent and said second zeolite is present in said composition in an amount up to 20 weight percent, wherein said weight percents are based on the total sum weight of said amorphous binder component, said high surface area zeolite and said second zeolite; and wherein said metal hydrogenation component is present in said composition in the range of from 2 to 40 parts by weight (calculated as metal) per 100 parts by weight of the total composition.

14. A middle distillate selective hydrocracking catalyst composition as recited in claim 1, wherein said unit cell size is in the range of from 24.30 to 24.36 Å.

15. A middle distillate selective hydrocracking catalyst composition as recited in claim 1, wherein said unit cell size is in the range of from 24.30 to 24.35 Å.

16. A middle distillate selective hydrocracking catalyst composition as recited in claim 1, wherein said zeolite has an alkali content of less than about 1% wt.

17. A process for the conversion of a hydrocarbonaceous feedstock into lower boiling materials, which comprises contacting the feedstock with hydrogen at elevated temperature and pressure in the presence of a hydrocracking catalyst composition which comprises a metal hydrogenation component selected from the group of metals consisting of molybdenum, tungsten, cobalt, nickel and combinations of two or more thereof supported on a carrier comprising an amorphous binder component and from 2 to 80% by weight, based on the total weight of the carrier, a zeolite of the faujasite structure having a unit cell size in the range of from 24.14 to 24.38 Å, a bulk silica to alumina ratio (SAR) above about 12, and a surface area of at least about 850 m$^2$/g as measured by the BET method and ATSM D 4365-95 with nitrogen adsorption at a p/po value of 0.03, and a micropore volume of at least about 0.28 ml/g.

18. A process as claimed in claim 17, which is carried out at a temperature in the range of from 250 to 500° C. and a total pressure in the range of from $3\times10^6$ to $3\times10^7$ Pa.

19. A composition comprising: a first zeolite of the faujasite structure having a first zeolite unit cell size in the range of from 24.24 to 24.38 Å; a bulk silica to alumina molar ratio in the range of from 20 to 100; and a surface area of at least 850 m$^2$/g.

20. A composition as recited in claim 19, further comprising: a metal hydrogenation component selected from the group consisting of nickel, cobalt, molybdenum, tungsten, platinum and palladium.

21. A composition as recited in claim 20, further comprising: a second zeolite selected from the group consisting of zeolite beta, ZSM-5 and zeolite Y having a second zeolite unit cell size greater than 24.40 Å.

22. A composition as recited in claim 21, further comprising: an amorphous binder component selected from the group consisting of alumina, silica, silica-alumina, and mixtures thereof.

23. A composition as recited in claim 22, wherein said first zeolite is present in said composition in amount up to 90 weight percent and said second zeolite is present in said composition in an amount up to 20 weight percent, wherein said weight percents are based on the total sum weight of said amorphous binder component, said first zeolite and said second zeolite; and wherein said metal hydrogenation component is present in said composition in the range of from 2 to 40 parts by weight (calculated as metal) per 100 parts by weight of the total composition.

24. A composition as recited in claim 19, wherein said first zeolite unit cell size is in the range of from 24.24 to 24.36.

25. A composition as recited in claim 19, wherein said first zeolite unit cell size is in the range of from 24.30 to 24.35.

26. A composition as recited in claim 19, wherein said first zeolite has a micropore volume of greater than about 0.28 m$^2$/g and said first zeolite unit cell size is in the range of from 24.30 to 24.35, said bulk silica to alumina molar ratio is in the range of from 20 to 50, and said surface area is at least 910 m$^3$/g.

27. A middle distillate selective hydrocracking process, comprising: providing a feedstock comprising hydrocarbons boiling in the range of from 330° C. to 650° C.; contacting said feedstock in the presence of hydrogen at an elevated temperature and an elevated pressure with a middle distillate selective hydrocracking catalyst composition as defined in any one of claims 1, 2, 3, 4, 5, 6, 7, 9, 10, 11, 12, 13, 14, 15, and 16; and yielding a middle distillate product comprising middle distillate hydrocarbons boiling in the range of from 150° C. to 370° C., wherein said elevated temperature is in the range of from 250° C. to 500° C.; said elevated pressure is in the range of from $3\times10^6$ to $3\times10^7$ Pa; and said hydrogen is present in an amount such that the hydrogen partial pressure is in the range of from $4\times10^6$ to $2.5\times10^7$ Pa; and the space velocity is in the range of from 0.1 to 10 kg of said feedstock per liter of said middle distillate selective hydrocracking catalyst composition per hour (kg$\times$l$^{-1}\times$hr$^{-1}$).

28. A composition as recited in any one of claims 19, 24, and 25, wherein said surface area is at least 875 m$^2$/g.

29. A composition as recited in claim 19, 24, 25 and 28, wherein said first zeolite has a first zeolite micropore volume greater than about 0.28 m$^3$/g.

30. A composition as recited in claim 19, 24, 25 and 28, wherein said bulk silica to alumina molar ratio is in the range of from 20 to 50.

31. A composition as recited in claim 19, 24, 25 and 28, wherein said first zeolite is made by a process that comprises:
  a) hydrothermally treating a starting zeolite of the faujasite structure having a silica to alumina molar ratio in the range of from about 4.5 to about 6.5, and an alkali content of less than about 1.5% wt; at a temperature in the range of from 600° C. to 800° C. and at a partial pressure of steam in the range of from about 0.2 to about 1 atmosphere for a time effective to produce an intermediate zeolite having a unit cell size of from 24.30 to 24.45 Å;
  b) contacting said intermediate zeolite with an acidified solution comprising an acid and an ammonium salt under conditions effective to produce said first zeolite; and
  c) recovering said first zeolite.

* * * * *